United States Patent [19]

Hancock et al.

[11] 4,401,629
[45] Aug. 30, 1983

[54] SELECTIVE IMIDAZOLE ION EXCHANGE RESINS

[75] Inventors: Robert D. Hancock, Bryanston; Brian R. Green, Roodepoort, both of South Africa

[73] Assignee: National Institute for Metallurgy, Randburg, South Africa

[21] Appl. No.: 242,410

[22] Filed: Mar. 10, 1981

[30] Foreign Application Priority Data

Mar. 12, 1980 [ZA] South Africa ............... 80/1458

[51] Int. Cl.³ .................. B01J 39/20; C08F 226/06
[52] U.S. Cl. .................................. 423/24; 423/139; 521/38; 526/258; 526/262; 526/263
[58] Field of Search .......... 521/38; 526/258, 263, 526/262; 423/24, 139

[56] References Cited

U.S. PATENT DOCUMENTS

| | | | |
|---|---|---|---|
| 3,488,294 | 1/1970 | Annand et al. | 526/258 |
| 3,772,259 | 11/1973 | Williams et al. | 526/258 |
| 3,826,787 | 7/1974 | Cakozza | 526/258 |
| 4,104,227 | 8/1978 | Boessler et al. | 526/263 |
| 4,109,072 | 8/1978 | Panzer et al. | 526/258 |
| 4,202,944 | 5/1981 | Hancock | 521/32 |
| 4,254,087 | 3/1981 | Grinstead | 423/94 |

FOREIGN PATENT DOCUMENTS 887872  1/1981  Belgium .

OTHER PUBLICATIONS

C. Abstracts, vol. 96, entry 218611d, B. M. Toskorin et al.

*Primary Examiner*—Joseph L. Schofer
*Assistant Examiner*—Peter F. Kulkosky
*Attorney, Agent, or Firm*—Cushman, Darby & Cushman

[57] ABSTRACT

A polymeric ion exchange resin of the cross-linked type in which the active groups may be constituted either wholly or in part by an imidazole group which is, in turn, attached directly to a cross-linked, polymerized vinyl backbone. The optional substituents on the imidazole ring include optionally substituted pyridyl, imidazolyl or amino groups which can be substantially known type. A method of preparation of such resins includes the provision of at least the imidazole ring on the vinyl monomer before polymerization thereof. The active groups may be added or modified after polymerization with a cross-linking agent.

18 Claims, 3 Drawing Figures

SELECTIVE IMIDAZOLE ION EXCHANGE RESINS

BACKGROUND TO THE INVENTION

This invention relates to ion exchange resins of the type exhibiting selectivity towards certain metal ions over others which may be present in the same solution.

In particular, but not exclusively, the invention is concerned with the provision of ion exchange resins capable of being utilised to separate copper, nickel and cobalt both from each other and also from other metals in solution. In this regard the present invention relates to an ion exchange resin of the general type described in our earlier U.S. Pat. No. 4,202,944 and some of the resins provided by this invention fall within the general scope of our said earlier patent whilst not being specifically disclosed therein.

The ion exchange resins described in our said earlier patent have been superceded by the resins of the present invention which are easier to manufacture and which possess improved properties, particularly from a point of view of increased loading capacity.

Thus the object of this invention is to provide ion exchange resins exhibiting selectivity towards certain metals in solution and wherein an improvement is achieved in the loading capacity of the ion exchange resin.

SUMMARY OF THE INVENTION

In accordance with this invention there is provided a polymeric ion exchange resin composed basically of cross-linked recurring units of the following formula:

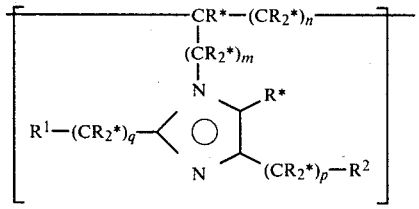

wherein:
n is 1, 2 or 3
m is 0, 1 or 2
q is 0 or 1
p is 0 or 1
each $R^*$ independently of the others is selected from hydrogen and any substituent which will not affect the ion exchange properties adversely and which will preferably enhance same, and,
$R^1$ and $R^2$, independently of each other represent hydrogen, optionally substituted pyridyl, optionally substituted imidazolyl or the group

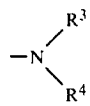

in which $R^3$ and $R^4$ independently of each other, is hydrogen, an optionally substituted alkyl radical, or one of the following groups:

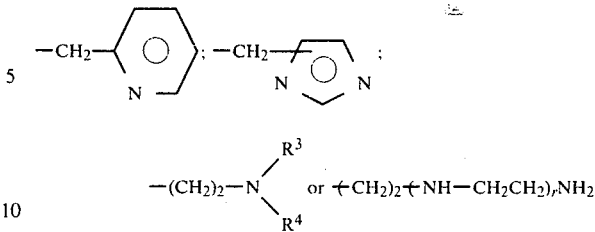

in which r is an integer from 1 to 3.

Preferably $R^1$ and $R^2$ are not both hydrogen at the same time and $R^*$ in each case is most conveniently hydrogen. Also, n is preferably 1; m is preferably 0 or 1 and p and q are each 0 or 1.

In cases where $R^1$ or $R^2$ are amino groups then $R^3$ and $R^4$ can be an acetate radical, hydroxy ethyl or methyl pyridyl.

It is a particularly important feature of this invention that the resins as described above can be manufactured by firstly attaching at least a part, in particular, the imidazole ring, and preferably all of the functional group on to a vinyl group and then subsequently polymerising the monomer with a desired content of a cross-linking agent. Conveniently the cross-linking agent can be divinylbenzene or any other suitable cross-linking agent.

The vinyl monomer may be made in many different ways which will be quite apparent to those skilled in the art and, for example, the substituted imidazole can be reacted with monochlor ethylene in the presence of sodium hydroxide to yield the vinyl imidazole monomer. Alternatively, the substituted imidazole could be reacted with acetylene also to form the required monomer. Other alternatives are to react the substituted imidazole with vinyl acetate to give the vinylated product or with ethylene oxide to give the 2-hydroxyethyl substituted product which is subsequently dehydrated to give the vinylated product.

Whichever method is utilised to produce the monomer, it may then be polymerised, in the presence of a suitable cross-linking agent, to form the final resin.

It is also possible that the active groups may be modified or be subjected to addition reactions to change them after the polymerisation but it is certainly preferred that the imidazole group be attached to the vinyl group prior to polymerisation.

It has been found that with resins made according to the present invention, a higher capacity can be achieved in many cases when compared with the resins described in our said earlier patent. It is believed that the improved capacity, as well as the improved selectivity for the separation of nickel from cobalt, could well be a result of there being less inactive matter present in the resin on a weight basis when compared to the weight of the active groups themselves. In addition, it has been found that resins according to the present invention may well, if present indications continue, turn out to be more easily stripped than the prior art resin made in accordance with our earlier patent. This is exemplified in the attached drawings, FIG. 1 of which shows the loadings of copper in millimols per gramme versus the pH on a pyridyl imidazole polyvinyl resin cross-linked with divinyl benzene. The curve labelled with a numeral 1 was plotted when the prior art resin made in accordance with our earlier patent was utilized, this resin being a polystyrene based resin having pyridyl-imidazole active groups attached thereto. This must be compared to the curve numbered 2 which is for the simple pyridyl-imidazole vinyl resin according to the present invention. It will be noted that as a result of the substantial increase in steepness of the latter curve, which crosses the former at a pH of about 1, substantially increased loading can be effected above a pH of 1 whilst at a pH of about 0 stripping is much more effective.

Figure 1:
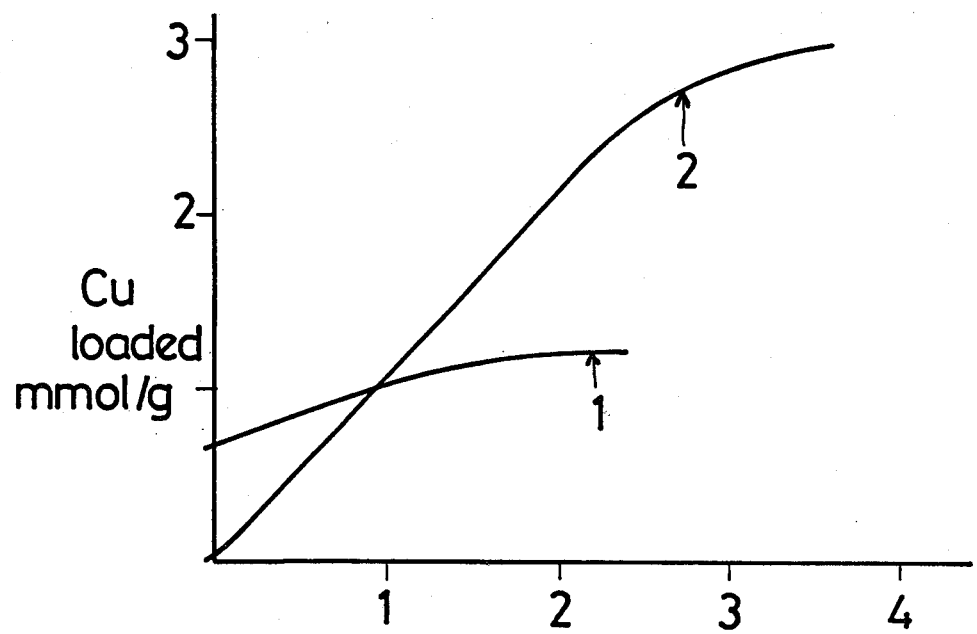
FIGS. 1, 2 and 3 are graphical comparisons of existing resins and the equivalent when made according to the invention illustrating the capacities under specific conditions towards Copper, Nickel, and Cobalt respectively.
Figure 2:
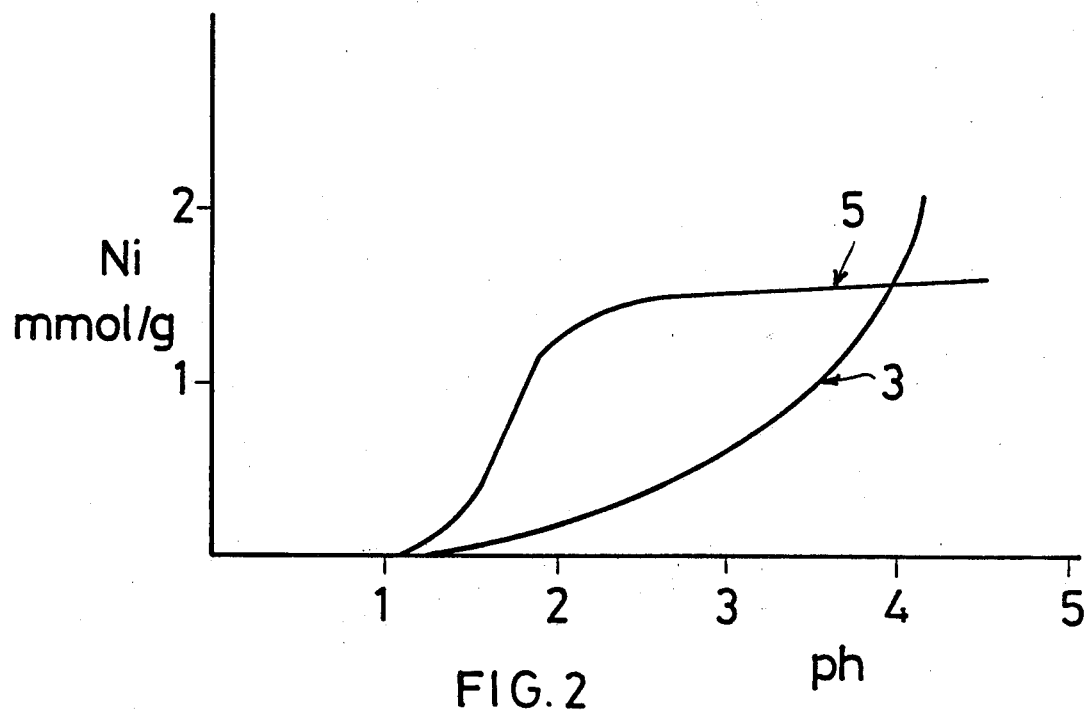
Figure 3:
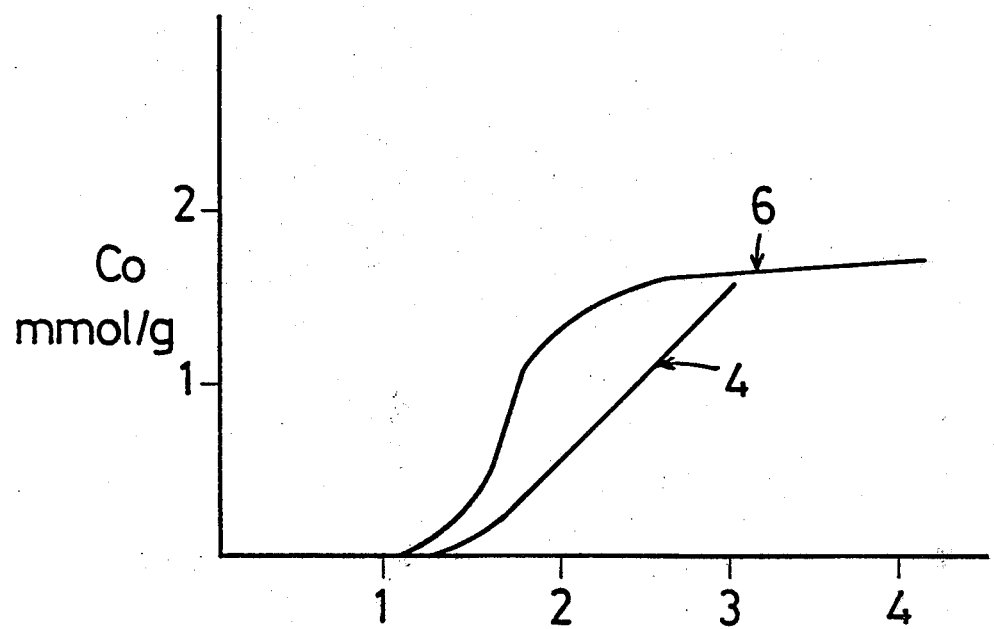

FIGS. 2 and 3 are similar graphs but relate to an amino-ethyl imidazole vinyl polymer with divinyl benzene. The prior art resins' curves are labelled 3 and 4 respectively and the curves of this invention are labelled 5 and 6. In both cases a similar improvement to that shown in FIG. 1 is achieved. The specific resin was in this case a di-acetate amino-methyl imidazole vinyl polymer referred to later as AMI2.

The improvements observed in the performance of the two resins which have their behaviour depicted in FIG. 1 with respect to their loading are given more accurately in the following table. In this table the metal capacities are those obtained at an equilibrium solution concentration of 1 g/l of the metal, i.e. Cu and Ni in the first two columns and Ni and Cobalt in the second two columns. The pH of the sulphate solution was 4. In the table the letter $\alpha A/B$ means the separation factor and is given by the expression $([A] [\bar{B}])/([A] [\bar{B}])$ in which [A] or [B] is concentration of metal in solution and $[\bar{A}] [\bar{B}]$ is the concentration of the metal on the resin.

TABLE

| Resin | Cu loaded m mol/g | αCu/Ni | Ni loaded m mol/g | αNi/Co |
|---|---|---|---|---|
| PI 1 (polystyrene) | 1,5 | 10 | 0,82 | 10 |
| PI 4 (polyvinyl) | 3,2 | 31 | 1,30 | 50 |

It is believed in general that the improved selectivities result from a matrix effect. In the resins according to this invention the active groups are closer to the polymer backbone and therefore, it is believed, that crowding may be alleviated by the avoidance of the larger metal ions. Also the selectivity exhibited accords with the fact that the cobalt ion is larger than the nickel ion which in turn is larger than the copper ion.

DETAILED EMBODIMENTS OF THE INVENTION

The invention will be further described by means of the following examples:

EXAMPLE 1

Vinylimidazole/DVB copolymer with optional amine active groups

A mixture of 3,0 g vinylimidazole, 0,30 g divinyl-benzene (50%) and 0,025 g α-azo-isobutyronitrile was heated in a sealed tube at 90° for 24 h. The product was crushed and washed with water. Properties of the product resin were:

Water retention capacity = 54%

Base capacity = 8,5 mmol/g $U_3O_8$ capacity (from a 200 ppm) solution at a pH of 1,8) = 50 g/l The relatively high anion exchange capacity for uranium indicates that this resin could also be employed as a conventional weak base type resin.

In an alternative polymerization procedure a mixture of 10 g of vinyl imidazole, 5 g of decane, 3,5 g of octanol, 1 g of divinylbenzene and 0,4 g of t-butylhydroperoxide was sealed in a glass tube after being flushed with nitrogen with the object of producing a macroporous matrix. The mixture was heated at 80° for 4 h and 100° for 70 h. The polymer was crushed to obtain particles of suitable size, washed with acetone to remove inert solvents, and dried.

To 3,28 g of the resin thus produced were added 40 ml of 30% v/v formaldehyde and 14,8 g of paraformaldehyde and the mixture was refluxed for 48 hours. The product was separated, washed with water and dried.

16 ml of conc. $H_2SO_4$ was added slowly to 68 ml of conc. HBr while stirring and 4 g of the above described formylated resin was added to the solution and allowed to swell. Another 16 ml of conc. $H_2SO_4$ was added dropwise with occasional swirling and the mixture was then heated to 70° and maintained at this temperature of 20 h. The product was recovered by filtration and washed with dry methanol to remove entrained acid.

The above product was divided into four parts and each was treated to provide an amino-methyl imidazole product with the four products being given the reference numbers AMI 1, AMI 2, AMI 3, AMI 4. These four products were made as follows:

AMI 1

To about a quarter of the product from the previous step, was added 5,5 ml of dry methanol, 3,4 g of diethanol amine and 2 g of anhydrous $Na_2CO_3$. The mixture was maintained at room temperature for 20 h and at 70° for 48 h. The product resin was washed with water.

AMI 2

The method was similar to that for AMI 1 except that 11 ml of methanol was used. The amine used was dimethyliminodiacetate and after washing the product, the ester was converted to the acid by hydrolysis in 1 M NaOH at 70° for 24 h.

AMI 3

The method was similar to that for AMI except that the amine was hydroxyethyl picolylamine.

AMI 4

The method was similar to that for AMI except that the amine was bis-picolylamine.

The basic reaction taking place in the above process is believed to conform to the following equation:

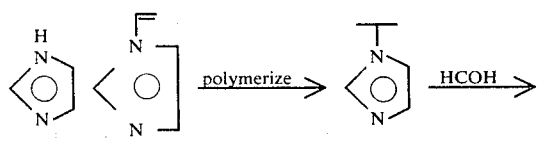

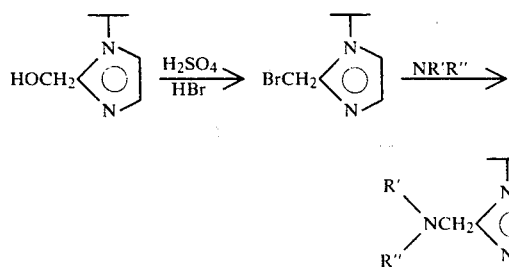

There was no equivalent to the resin AMI available for comparison purposes but tests carried out in the other three amino imidazole vinyl resins indicated that increased loading was often achieved in respect of one or more of copper, nickel and cobalt when compared to results obtained with equivalent commercial styrene based resins. The results of the experiments regarding AMI 2 are discussed above with reference to FIGS. 2 and 3 of the accompanying drawings.

In the case of AMI 3 similar results were observed to those of AMI 2 with regard to Nickel but very much better results were noted with regard to cobalt.

In the case of AMI 4 marginally improved results were noted with regard to nickel and slightly better results with regard to cobalt.

EXAMPLE 2

N'-vinyl-2-pyridyl-2'-imidazole/DVB copolymer

A mixture of 0,4 g vinyl pyridal imidazole, 0,046 g divinyl-benzene (50%) and 0,01 g α-azo-isobutronitrile was heated in a sealed tube at 90° for 18 h. The polymer was crushed and washed with 0,1 M HCl, water, 0,1 M NaOH and water to neutral pH. This polymer could also have been produced by a suspension polymerisation to produce resin beads if required.

EXAMPLE 3

A resin was prepared by the same method as that described in Example 2 using N'-vinyl-2-pyridyl-4'methyl-2'-imidazole.

The properties of the last two of these resin gave the following results:

| Resin Type | $Cu_{max}$ mmol/g | Separation factors $\alpha_{Cu/Fe3+}$ | $\alpha_{Ni/Co}$ | Cu on resin in 20g/l Cu + 120g/l $H_2SO_4$ |
|---|---|---|---|---|
| Pyridylimidazole on polystyrene matrix | 2,9 | 27 | 10 | 1,6 |
| Product from Example 2 | 3,9 | 22 | 50 | 1,2 |
| Pyridyl methylimidazole on polystyrene matrix | 2,5 | 22 | — | 0,5 |
| Product from Example 3 | 4,4 | 13 | — | 0,4 |

From the table it can be seen that
(i) Maximum copper capacities are higher than on a similar polystyrene based resin.
(ii) Selectivity for nickel over cobalt is better for the polyvinyl pyridyl-imidazole resin.
(iii) The resins are more easily eluted by 120 g/l sulphuric acid.

EXAMPLE 4

A resin was prepared by the same method using a 1,4'-bisimidaxole. This resin was compared with the resin of example 2 as well as a commercial resin sold under the trade name XFS4196 by the DOW Chemical Corporation. The loading behaviour and separation factors are given below in the following table:

| Resin | Cu loaded (g/l Cu, 3g/l $Fe^{3+}$ pH 2)[a], mmol/g | Separation Factor: $\alpha_{Cu/Fe}$ | Cu loaded (20g/l Cu, 12% $H_2SO_4$)[b] mmol/g |
|---|---|---|---|
| Bis-imidazole | 1,92 | 18 | 0,6 |
| Pyridyl-imidazole Example 2 | 2,60 | 22 | 1,2 |
| DOW XFS 4196 | 1,30 | 14 | 0,5 |

This resin it is noted had improved stripping characteristics over the resin of Example 2 and approximately the same as the commercial resin (XFS4196). On the other hand this resin had improved capacity and selectivity over the commercial resin.

Thus it will be appreciated that the invention provides ion exchange resins having improved capacities over those of which applicant is aware and which were available previously and, also wherein the ion exchange resins can be made in a simple manner as hereinbefore described.

We claim:

1. A polymeric ion exchange resin composed essentially of cross-linked recurring units of the following formula:

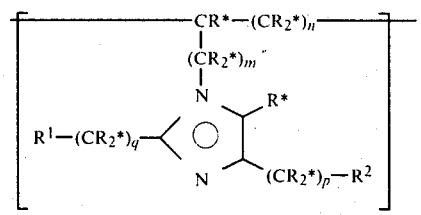

wherein:
n is 1, 2 or 3
m is 0, 1 or 2
q is 0 or 1
p is 0 or 1
each R* independently of the others is selected from hydrogen and any substituent which will not affect the ion exchange properties adversely and which will preferably enhance same, and,
$R^1$ and $R^2$, independently of each other represent hydrogen, optionally substituted pyridyl, optionally substituted imidazolyl or the group

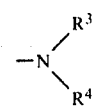

in which $R^3$ and $R^4$ independently of each other, is hydrogen, an optionally substituted alkyl radical, or one of the following groups:

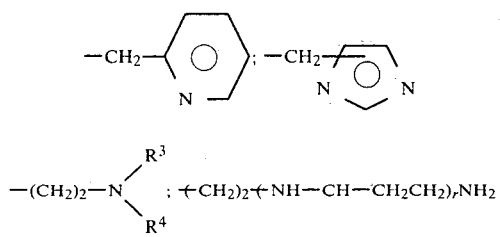

in which r is an integer of from 1 to 3.

2. A polymeric ion exchange resin as claimed in claim 1 in which $R^1$ and $R^2$ are not both hydrogen at the same time.

3. A polymeric ion exchange resin as claimed in claim 1 in which $R^*$ is hydrogen.

4. A polymeric ion exchange resin as claimed in claim 1 in which n is 1; m is 0 or 1 and p and q are each 0 or 1.

5. A polymeric ion exchange resin as claimed in claim 1 in which either $R^1$ or $R^2$ is pyridyl.

6. A polymeric ion exchange resin as claimed in claim 1 in which either $R^1$ or $R^2$ is an amino group and $R^3$ and $R^4$ are independently selected from the groups hydroxyl ethyl, acetate, and methyl-pyridyl.

7. A method of producing a polymeric ion exchange resin as claimed in claim 1 in which an imidazole vinyl compound is polymerized together with a cross-linking agent to form said resin.

8. A method as claimed in claim 7 in which the imidazole vinyl compound has the required active groups attached thereto prior to polymerization of the vinyl compound.

9. A method as claimed in claim 7 in which active groups are modified or added subsequent to polymerization of the vinyl compound.

10. A resin prepared by the method as claimed in claim 7.

11. A polymeric ion exchange resin as claimed in claim 1, 3 or 7 in which the resin itself is cross-linked with divinyl benzene.

12. A method as claimed in claim 11 in which the resin is cross-linked with divinyl benzene.

13. A polymer ion exchange resin as claimed in claim 1 having the loading capacity for copper as depicted in curve 2 of FIG. 1.

14. A polymer ion exchange resin as claimed in claim 1 having the loading capacity for nickel as depicted in curve 5 of FIG. 2.

15. A polymer ion exchange resin as claimed in claim 1 having the loading capacity for cobalt as depicted in curve 6 of FIG. 3.

16. A polymer ion exchange resin as claimed in claim 1 characterized in having the loading capacities for copper as depicted in curve 2 of FIG. 1, nickel as depicted in curve 5 of FIG. 2, and cobalt as depicted in curve 6 of FIG. 3.

17. A method of selectively separating copper from nickel from a solution containing copper, nickel and optionally cobalt, comprising the steps of:
(1) contacting said solution at a copper absorbing pH with a polymeric ion exchange resin composed essentially of cross-linked recurring units of the following formula:

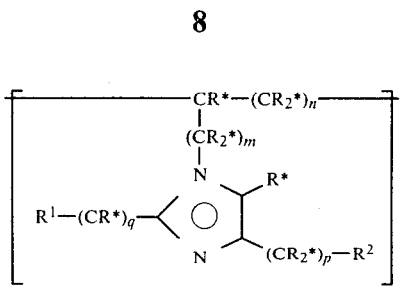

wherein:
n is 1, 2 or 3
m is 0, 1 or 2
q is 0 or 1
p is 0 or 1
each $R^*$ independently of the others is selected from hydrogen and any substituent which will not affect the ion exchange properties adversely and which will preferably enhance same, and, $R^1$ and $R^2$, independently of each other represent hydrogen, optionally substituted pyridyl, optionally substituted imidazolyl or the group

in which $R^3$ and $R^4$ independently of each other, is hydrogen, an optionally substituted alkyl radical, or one of the following groups:

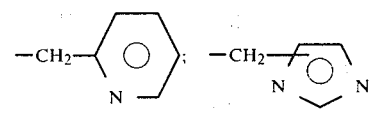

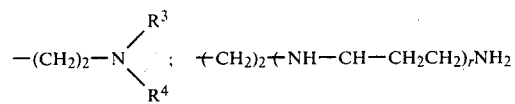

in which r is an integer of from 1 to 3; and thereafter (2) removing the copper absorbed on said ion exchange resin by lowering the pH.

18. A method of selectively separating nickel from cobalt from a solution containing nickel and cobalt ions, comprising the steps of
(1) contacting said solution at a nickel-absorbing pH with a polymeric ion exchange resin composed essentially of cross-linked recurring units of the following formula:

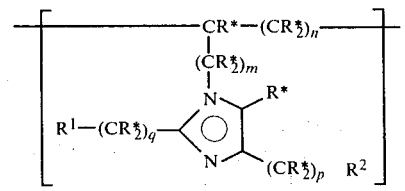

wherein:
n is 1, 2 or 3
m is 0, 1 or 2 q is 0 or 1 p is 0 or 1 each R* independently of the others is selected from hydrogen and any substituent which will not affect the ion exchange properties adversely and which will preferably enhance same, and, R$^1$ and R$^2$, independently of each other represent hydrogen, optionally substituted pyridyl, optionally substituted imidazolyl or the group

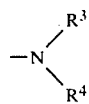

in which R$^3$ and R$^4$ independently of each other, is hydrogen, an optionally substituted alkyl radical, or one of the following groups:

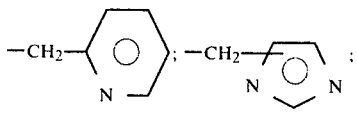

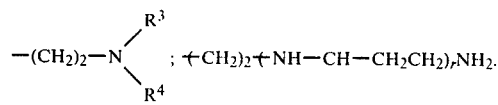

in which r is an integer of from 1 to 3; and thereafter (2) removing the nickel absorbed thereon by lowering the pH.

* * * * *